United States Patent
Steinmetz et al.

(10) Patent No.: US 7,356,398 B2
(45) Date of Patent: Apr. 8, 2008

(54) SYNCHRONOUS SHIFT CONTROL IN AN ELECTRICALLY VARIABLE TRANSMISSION

(75) Inventors: Todd M Steinmetz, Indianapolis, IN (US); Jy-Jen F. Sah, West Bloomfield, MI (US); Tung-Ming Hsieh, Carmel, IN (US)

(73) Assignee: General Motors Corporation, Detroit, MI (US)

( * ) Notice: Subject to any disclaimer, the term of this patent is extended or adjusted under 35 U.S.C. 154(b) by 456 days.

(21) Appl. No.: 10/686,510

(22) Filed: Oct. 14, 2003

(65) Prior Publication Data
US 2005/0080540 A1    Apr. 14, 2005

(51) Int. Cl.
*G06F 7/00*    (2006.01)
*G06F 17/00*   (2006.01)

(52) U.S. Cl. .......................... 701/55; 701/51; 701/53; 701/64; 701/66; 701/22; 477/15; 180/65.1; 180/65.7

(58) Field of Classification Search .............. 701/51, 701/53–54, 64, 66–68, 55, 22; 477/3–8, 477/14–17; 180/65.1–65.7
See application file for complete search history.

(56) References Cited

U.S. PATENT DOCUMENTS

| | | | | |
|---|---|---|---|---|
| 4,733,580 A | * | 3/1988 | Kubo et al. ................. | 477/129 |
| 5,165,308 A | * | 11/1992 | Asada et al. ................ | 477/154 |
| 5,833,570 A | * | 11/1998 | Tabata et al. ................. | 477/3 |
| 5,890,392 A | * | 4/1999 | Ludanek et al. .............. | 74/331 |
| 5,931,757 A | * | 8/1999 | Schmidt ....................... | 475/2 |
| 5,982,045 A | * | 11/1999 | Tabata et al. ................. | 290/17 |
| 6,090,005 A | * | 7/2000 | Schmidt et al. ............... | 475/5 |
| 6,122,583 A | * | 9/2000 | Kirchhoffer et al. .......... | 701/51 |
| 6,351,700 B1 | * | 2/2002 | Muramoto et al. ........... | 701/51 |
| 6,358,173 B1 | * | 3/2002 | Klemen et al. ............... | 475/5 |
| 6,491,599 B1 | * | 12/2002 | Schmidt ....................... | 475/5 |
| 6,527,659 B1 | * | 3/2003 | Klemen et al. ............... | 475/5 |
| 6,551,208 B1 | * | 4/2003 | Holmes et al. ............... | 475/5 |
| 6,575,872 B2 | * | 6/2003 | Gluck et al. .................. | 477/68 |
| 6,656,087 B1 | * | 12/2003 | Runde et al. ................ | 477/107 |

* cited by examiner

*Primary Examiner*—Gertrude A. Jeanglaude (57) ABSTRACT

Synchronous shift control in a multi-mode, hybrid transmission utilizes motor torques to control clutch synchronizations and torque conditions thereacross for substantially torque disturbance free shifting from one mode to another.

27 Claims, 7 Drawing Sheets

SYNCHRONOUS SHIFT CONTROL IN AN ELECTRICALLY VARIABLE TRANSMISSION

TECHNICAL FIELD

The present invention is related to control of a multi-mode hybrid transmission. More particularly, the invention is concerned with shifts of the transmission from one mode to another mode.

BACKGROUND OF THE INVENTION

Various hybrid powertrain architectures are known for managing the input and output torques of various prime-movers in hybrid vehicles, most commonly internal combustion engines and electric machines. Series hybrid architectures are generally characterized by an internal combustion engine driving an electric generator which in turn provides electrical power to an electric drivetrain and to a battery pack. The internal combustion engine in a series hybrid is not directly mechanically coupled to the drivetrain. The electric generator may also operate in a motoring mode to provide a starting function to the internal combustion engine, and the electric drivetrain may recapture vehicle braking energy by also operating in a generator mode to recharge the battery pack. Parallel hybrid architectures are generally characterized by an internal combustion engine and an electric motor which both have a direct mechanical coupling to the drivetrain. The drivetrain conventionally includes a shifting transmission to provide the necessary gear ratios for wide range operation.

Electrically variable transmissions (EVT) are known which provide for continuously variable speed ratios by combining features from both series and parallel hybrid powertrain architectures. EVTs are operable with a direct mechanical path between an internal combustion engine and a final drive unit thus enabling high transmission efficiency and application of lower cost and less massive motor hardware. EVTs are also operable with engine operation mechanically independent from the final drive or in various mechanical/electrical split contributions thereby enabling high-torque continuously variable speed ratios, electrically dominated launches, regenerative braking, engine off idling, and multi-mode operation.

Generally, it is desirable to perform ratio changes in a transmission such that torque disturbances are minimized and the shifts are smooth and unobjectionable. Additionally, it is generally desirable to perform releases and applications of clutches in a manner which dissipates the least amount of energy and does not negatively impact durability of the clutches. A major factor affecting these considerations is the torque at the clutch being controlled which may vary significantly in accordance with such performance demands as acceleration and vehicle loading. In certain EVTs, shift torque reductions can be accomplished by a zero or close to zero torque condition at the clutches at the time of application or release, which condition follows substantially zero slip thereacross.

SUMMARY OF THE INVENTION

Therefore in accordance with one aspect of the present invention upshifts and downshifts are performed with minimal torque disturbances. In accordance with another aspect of the present invention, upshifts and downshifts are performed during synchronous operation of the transmission wherein oncoming and offgoing clutches are applied and released at zero slip speed and zero slip speed acceleration.

In accordance with the present invention, an oncoming clutch is applied while controlling slip speed across the oncoming clutch to substantially zero by adjusting motor torque. Thereafter, an offgoing clutch is released while controlling slip speed across the offgoing clutch to substantially zero by adjusting motor torque.

A computer based implementation includes a controller for establishing motor torque in accordance with one of a plurality of motor controls including: a mode motor control during which the transmission is operating in one of two adjacent modes and transmission motor torque is used to control transmission input member speed to a target determined independent of speed across the clutches; a shift initiation motor control during which transmission motor torque is used to control speed across an oncoming clutch to substantially zero; and, a shift completion motor control during which transmission motor torque is used to control speed across an offgoing clutch to substantially zero.

BRIEF DESCRIPTION OF THE DRAWINGS

FIGS. 4A through 4D are diagrams illustrating an exemplary upshift from MODE 1 to MODE 2 in accordance with the present invention wherein

FIG. 7 is a block diagram of the determination of a closed loop control effort utilized in motor torque control for clutch synchronizations in accordance with the present invention; and, FIGS. 8A through 8D are diagrams illustrating an exemplary downshift from MODE 2 to MODE 1 in accordance with the present invention wherein

DESCRIPTION OF THE PREFERRED EMBODIMENT

Figure 1:
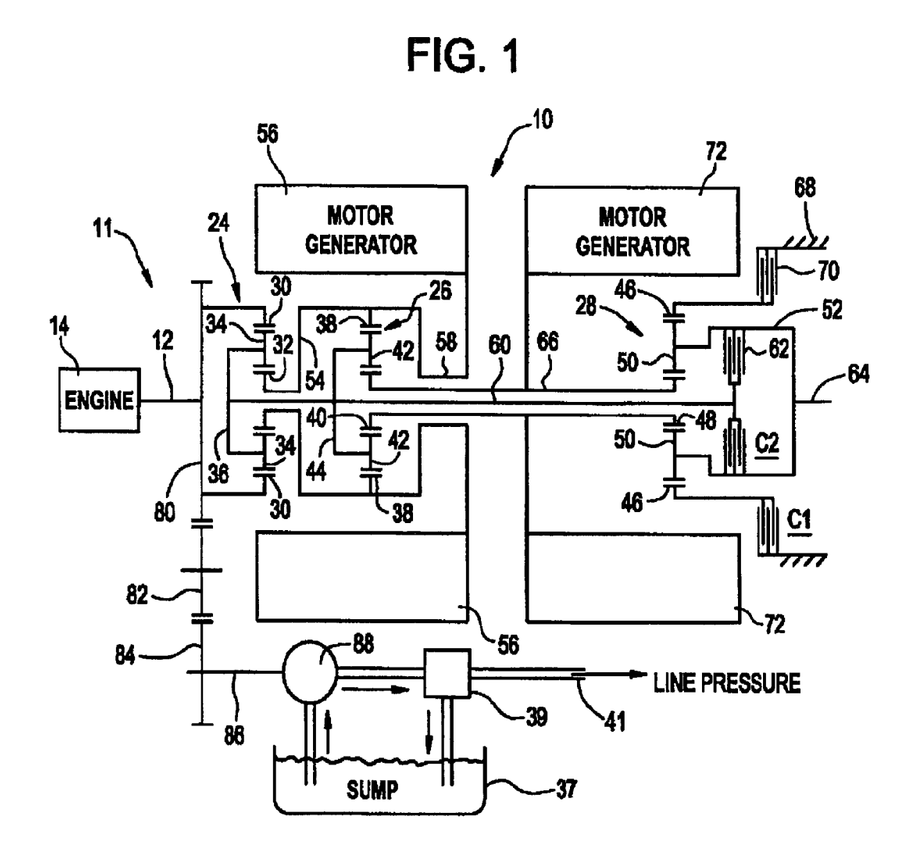
FIG. 1 is a mechanical hardware schematic representation of one preferred form of a two-mode, compound-split, electrically variable transmission particularly suited to the control of the present invention.
Figure 2:
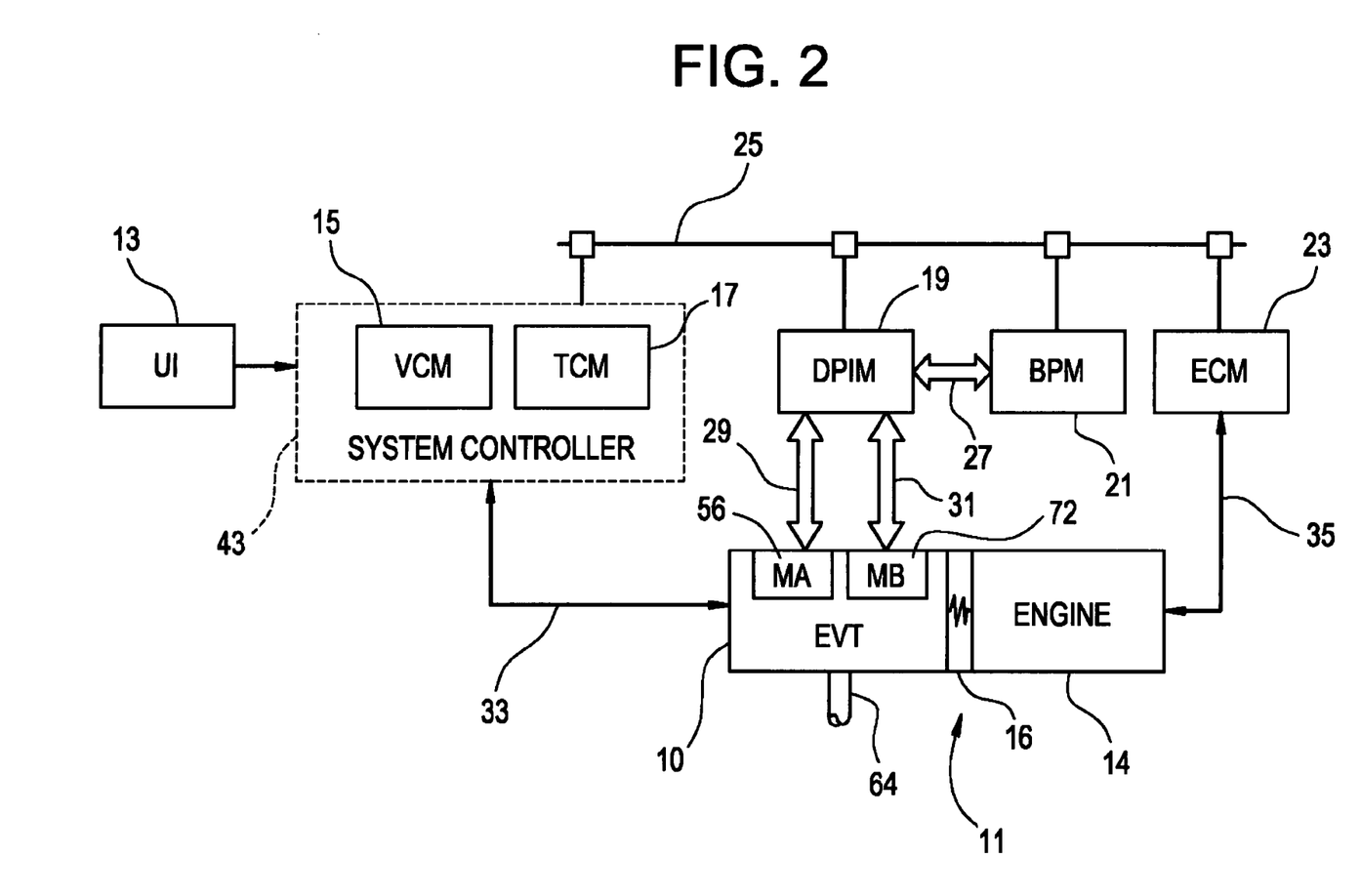
FIG. 2 is an electrical and mechanical schematic of a preferred system architecture for implementing the control of the present invention.

With reference first to FIGS. 1 and 2, a vehicular powertrain is generally designated 11. Included in the powertrain 11 is one representative form of a multi-mode, compound-split, electrically variable transmission (EVT) particularly suited for implementing the controls of the present invention and designated generally by the numeral 10 in FIGS. 1 and 2. With particular reference, then, to those figures, the EVT 10 has an input member 12 that may be in the nature of a shaft which may be directly driven by an engine 14 or, as shown in FIG. 2, a transient torque damper 16 may be incorporated between the output member of the engine 14 and the input member of the EVT 10. The transient torque damper 16 may incorporate, or be employed in conjunction with, a torque transfer device (not shown) to permit selective engagement of the engine 14 with the EVT 10, but it must be understood that such a torque transfer device is not utilized to change, or control, the mode in which the EVT 10 operates.

In the embodiment depicted the engine 14 may be a fossil fuel engine, such as a diesel engine which is readily adapted to provide its available power output delivered at a constant number of revolutions per minute (RPM). In the exemplary embodiment to which FIGS. 1 and 2 are directed, the engine 14 can—after start-up, and during the majority of its input—operate at a constant speed or at a variety of constant speeds in accordance with a desired operating point as may be determined from operator inputs and driving conditions.

The EVT 10 utilizes three planetary gear subsets 24, 26 and 28. The first planetary gear subset 24 has an outer gear member 30, that may generally be designated as the ring gear, which circumscribes an inner gear member 32, generally designated as the sun gear. A plurality of planet gear members 34 are rotatably mounted on a carrier 36 such that each planet gear member 34 meshingly engages both the outer gear member 30 and the inner gear member 32.

The second planetary gear subset 26 also has an outer gear member 38, generally designated as the ring gear, which circumscribes an inner gear member 40, generally designated as the sun gear. A plurality of planet gear members 42 are rotatably mounted on a carrier 44 such that each planet gear 42 meshingly engages both the outer gear member 38 and the inner gear member 40.

The third planetary gear subset 28 also has an outer gear member 46, generally designated as the ring gear, which circumscribes an inner gear member 48, generally designated as the sun gear. A plurality of planet gear members 50 are rotatably mounted on a carrier 52 such that each planet gear 50 meshingly engages both the outer gear member 46 and the inner gear member 48.

While all three planetary gear subsets 24, 26 and 28 are "simple" planetary gear subsets in their own right, the first and second planetary gear subsets 24 and 26 are compounded in that the inner gear member 32 of the first planetary gear subset 24 is conjoined, as through a hub plate gear 54, to the outer gear member 38 of the second planetary gear subset 26. The conjoined inner gear member 32 of the first planetary gear subset 24 and the outer gear member 38 of the second planetary gear subset 26 are continuously connected to a first motor/generator 56, as by a sleeve shaft 58. First motor/generator 56 may also be referred to herein variously as motor A or $M_A$.

The planetary gear subsets 24 and 26 are further compounded in that the carrier 36 of the first planetary gear subset 24 is conjoined, as through a shaft 60, to the carrier 44 of the second planetary gear subset 26. As such, carriers 36 and 44 of the first and second planetary gear subsets 24 and 26, respectively, are conjoined. The shaft 60 is also selectively connected to the carrier 52 of the third planetary gear subset 28, as through a torque transfer device 62 which, as will be hereinafter more fully explained, is employed to assist in the selection of the operational modes of the EVT 10. Torque transfer device 62 may also be referred to herein variously as second clutch, clutch two or C2.

The carrier 52 of the third planetary gear subset 28 is connected directly to the transmission output member 64. When the EVT 10 is used in a land vehicle, the output member 64 may be connected to the vehicular axles (not shown) that may, in turn, terminate in the drive members (also not shown). The drive members may be either front or rear wheels of the vehicle on which they are employed, or they may be the drive gear of a track vehicle.

The inner gear member 40 of the second planetary gear subset 26 is connected to the inner gear member 48 of the third planetary gear subset 28, as through a sleeve shaft 66 that circumscribes shaft 60. The outer gear member 46 of the third planetary gear subset 28 is selectively connected to ground, represented by the transmission housing 68, through a torque transfer device 70. Torque transfer device 70, as is also hereinafter explained, is also employed to assist in the selection of the operational modes of the EVT 10. Torque transfer device 70 may also be referred to herein variously as first clutch, clutch one or C1.

The sleeve shaft 66 is also continuously connected to a second motor/generator 72. Second motor/generator 72 may also be referred to herein variously as motor B or $M_B$. All the planetary gear subsets 24, 26 and 28 as well as motor A and motor B (56, 72) are coaxially oriented, as about the axially disposed shaft 60. It should be noted that both motors A and B are of an annular configuration which permits them to circumscribe the three planetary gear subsets 24, 26 and 28 such that the planetary gear subsets 24, 26 and 28 are disposed radially inwardly of the motors A and B. This configuration assures that the overall envelope—i.e.: the circumferential dimension—of the EVT 10 is minimized.

A drive gear 80 may be presented from the input member 12. As depicted, the drive gear 80 fixedly connects the input member 12 to the outer gear member 30 of the first planetary gear subset 24, and the drive gear 80, therefore, receives power from the engine 14 and/or the motor/generators 56 and/or 72. The drive gear 80 meshingly engages an idler gear 82 which, in turn, meshingly engages a transfer gear 84 that is secured to one end of a shaft 86. The other end of the shaft 86 may be secured to a transmission fluid pump and 88 which is supplied transmission fluid from sump 37, delivering high pressure fluid to regulator 39 which returns a portion of the fluid to sump 37 and provides regulated line pressure in line 41.

In the described exemplary mechanical arrangement, the output member 64 receives power through two distinct gear trains within the EVT 10. A first mode, or gear train, is selected when the first clutch C1 is actuated in order to "ground" the outer gear member 46 of the third planetary gear subset 28. A second mode, or gear train, is selected when the first clutch C1 is released and the second clutch C2 is simultaneously actuated to connect the shaft 60 to the carrier 52 of the third planetary gear subset 28.

Those skilled in the art will appreciate that the EVT 10 is capable of providing a range of output speeds from relatively slow to relatively fast within each mode of operation. This combination of two modes with a slow to fast output speed range in each mode allows the EVT 10 to propel a vehicle from a stationary condition to highway speeds. In addition, a fixed-ratio state wherein both clutches C1 and C2 are simultaneously applied is available for efficient mechanical coupling of the input member to the output member through a fixed gear ratio. Furthermore, a neutral state wherein both clutches C1 and C2 are simultaneously released is available for mechanically decoupling the output member from the transmission. Finally, the EVT 10 is capable to provide synchronized shifts between the modes wherein slip speed across both clutches C1 and C2 is substantially zero. Additional details regarding operation of the exemplary EVT can be found in commonly assigned U.S. Pat. No. 5,931,757, the contents of which are incorporated herein by reference.

Engine 14 is preferably a diesel engine and electronically controlled by engine control module (ECM) 23 as illustrated in FIG. 2. ECM 23 is a conventional microprocessor based diesel engine controller comprising such common elements as microprocessor, read only memory ROM, random access memory RAM, electrically programmable read only memory EPROM, high speed clock, analog to digital (A/D) and digital to analog (D/A) circuitry, and input/output circuitry and devices (I/O) and appropriate signal conditioning and buffer circuitry. ECM 23 functions to acquire data from a variety of sensors and control a variety of actuators, respectively, of the engine 14 over a plurality of discrete lines. For simplicity, ECM 23 is shown generally in bi-directional interface with engine 14 via aggregate line 35. Among the various parameters that may be sensed by ECM 23 are oil sump and engine coolant temperatures, engine speed (Ne), turbo pressure, and ambient air temperature and pressure. Various actuators that may be controlled by the ECM 23 include fuel injectors, fan controllers, engine preheaters including glow plugs and grid-type intake air heaters. ECM preferably provides for well known torque based controls for engine 14 in response to a torque command Te_cmd provided by the EVT control system. Such engines electronics, controls and quantities are generally well known to those skilled in the art and further detailed exposition thereof is not required herein.

As should be apparent from the foregoing description the EVT 10 selectively receives power from the engine 14. As will now be explained with continued reference to FIG. 2 the EVT also receives power from an electric storage device such as one or more batteries in battery pack module (BPM) 21. Other electric storage devices that have the ability to store electric power and dispense electric power may be used in place of the batteries without altering the concepts of the present invention. The BPM 21 is high voltage DC coupled to dual power inverter module (DPIM) 19 via DC lines 27. Current is transferable to or from the BPM 21 in accordance with whether the BPM 21 is being charged or discharged. DPIM 19 includes a pair of power inverters and respective motor controllers configured to receive motor control commands and control inverter states therefrom for providing motor drive or regeneration functionality. Motor controllers are microprocessor based controllers comprising such common elements as microprocessor, read only memory ROM, random access memory RAM, electrically programmable read only memory EPROM, high speed clock, analog to digital (A/D) and digital to analog (D/A) circuitry, and input/output circuitry and devices (I/O) and appropriate signal conditioning and buffer circuitry. In motoring control, the respective inverter receives current from the DC lines and provides AC current to the respective motor over high voltage phase lines 29 and 31. In regeneration control, the respective inverter receives AC current from the motor over high voltage phase lines 29 and 31 and provides current to the DC lines 27. The net DC current provided to or from the inverters determines the charge or discharge operating mode of the BPM 21. Preferably, MA and MB are three-phase AC machines and the inverters comprise complementary three-phase power electronics. Individual motor speed signals Na and Nb for MA and MB, respectively, are also derived by the DPIM 19 from the motor phase information or conventional rotation sensors. Such motors, electronics, controls and quantities are generally well known to those skilled in the art and further detailed exposition thereof is not required herein.

System controller 43 is a microprocessor based controller comprising such common elements as microprocessor, read only memory ROM, random access memory RAM, electrically programmable read only memory EPROM, high speed clock, analog to digital (A/D) and digital to analog (D/A) circuitry, digital signal processor (DSP), and input/output circuitry and devices (I/O) and appropriate signal conditioning and buffer circuitry. In the exemplary embodiment, system controller 43 comprises a pair of microprocessor based controllers designated as vehicle control module (VCM) 15 and transmission control module (TCM) 17. VCM and TCM may provide, for example, a variety of control and diagnostic functions related to EVT and vehicle chassis including, for example, engine torque commands, input speed control, and output torque control in coordination with regenerative braking, anti-lock braking and traction control. Particularly with respect to EVT functionality, system controller 43 functions to directly acquire data from a variety of sensors and directly control a variety of actuators, respectively, of the EVT over a plurality of discrete lines. For simplicity, System controller 43 is shown generally in bi-directional interface with EVT via aggregate line 33. Of particular note, system controller 43 receives frequency signals from rotation sensors for processing into input member 12 speed Ni and output member 64 speed No for use in the control of EVT 10. System controller 43 may also receive and process pressure signals from pressure switches (not separately illustrated) for monitoring clutch C1 and C2 application chamber pressures. Alternatively, pressure transducers for wide range pressure monitoring may be employed. PWM and/or binary control signals are provided by system controller to EVT 10 for controlling fill and drain of clutches C1 and C2 for application and release thereof. Additionally, system controller 43 may receive transmission fluid sump 37 temperature data, such as from conventional thermocouple input (not separately illustrated) to derive sump temperature Ts and provide a PWM signal which may be derived from input speed Ni and sump temperature Ts for control of line pressure via regulator 39. Fill and drain of clutches C1 and C2 are effectuated by way of solenoid controlled spool valves responsive to PWM and binary control signals as alluded to above. Trim valves are preferably employed using variable bleed solenoids to provide precise placement of the spool within the valve body and correspondingly precise control of clutch pressure during apply. Similarly, line pressure regulator 39 may be of a solenoid controlled variety for establishing regulated line pressure in accordance with the described PWM signal. Such line pressure controls are generally well known to those skilled in the art. Clutch slip speeds across clutches C1 and C2 are derived from output speed No, $M_A$ speed Na and $M_B$ speed Nb; specifically, C1 slip is a function of No and Nb, whereas C2 slip is a function of No, Na and Nb. Also illustrated is user interface (UI) block 13 which comprises such inputs to system controller 43 such as vehicle throttle position, push button shift selector (PBSS) for available drive range selection, brake effort and fast idle requests among others. System controller 43 determines a torque command Te_cmd and provides it to ECM 23. Torque command Te_cmd is representative of the EVT torque contribution desired from the engine as determined by the system controller.

The various modules described (i.e. system controller 43, DPIM 19, BPM 21, ECM 23) communicate via controller area network (CAN) bus 25. The CAN bus 25 allows for communication of control parameters and commands between the various modules. The specific communication protocol utilized will be application specific. For example the preferred protocol for heavy duty applications is the Society of Automotive Engineers standard J1939. The CAN bus and appropriate protocols provide for robust messaging and multi-controller interfacing between the system controller, ECM, DPIM, BPIM and other controllers such as antilock brake and traction controllers.

Figure 3:
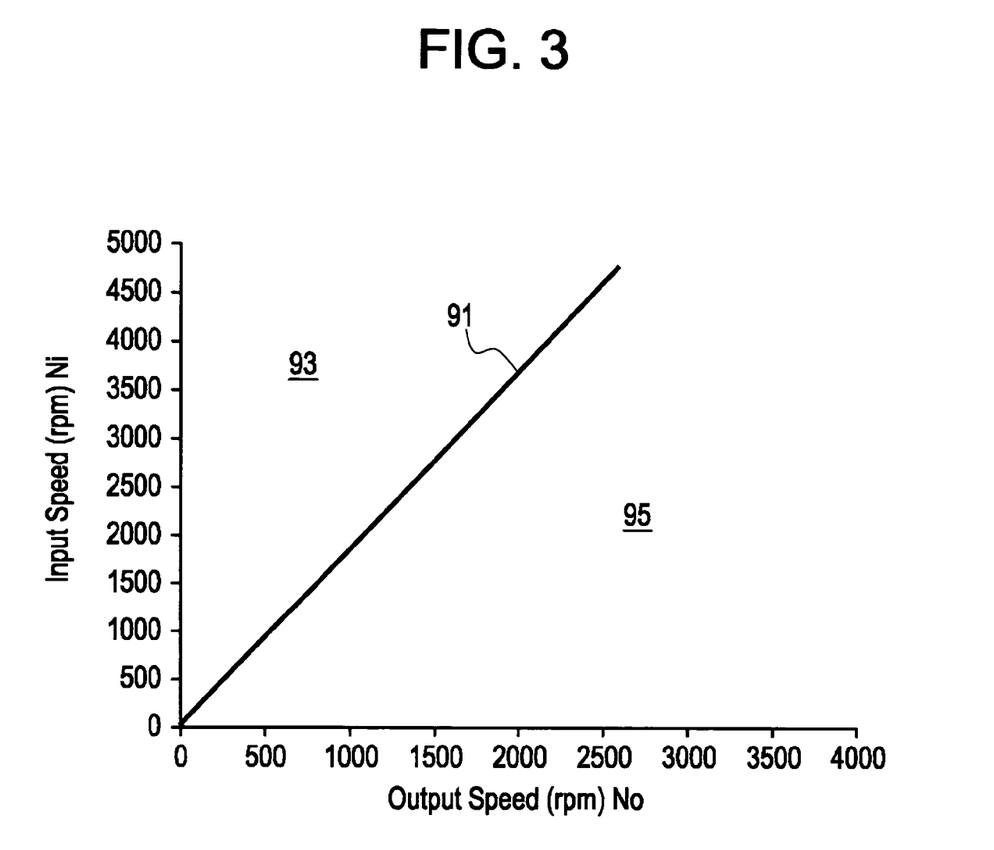
FIG. 3 is a graphical representation of various regions of operation with respect to input and output speeds of the exemplary EVT disclosed herein.

With reference to FIG. 3, a plot of output speed No along the horizontal axis versus input speed Ni across the vertical axis for the EVT 10 is illustrated. Synchronous operation, that is the input speed and output speed relationships whereat both clutch C1 and C2 are operating simultaneously with substantially zero slip speed thereacross is represented by line 91. As such, it represents the input and output speed relationships substantially whereat synchronous shifting from between modes can occur or whereat direct mechanical coupling from input to output can be effected by simultaneous application of both clutches C1 and C2, also known as fixed-ratio. One particular gearset relationship capable of producing the synchronous operation depicted by line 91 in FIG. 3 is as follows: outer gear member 30 having 91 teeth, inner gear member 32 having 49 teeth, planet gear members 34 having 21 teeth; outer gear member 38 having 91 teeth, inner gear member 40 having 49 teeth, planet gear members 42 having 21 teeth; outer gear member 46 having 89 teeth, inner gear member 48 having 31 teeth, planet gear members 50 having 29 teeth. Line 91 may be variously referred to herein as synchronous line, shift ratio line or fixed-ratio line.

To the left of the shift ratio line 91 is a preferred region of operation 93 for the first mode wherein C1 is applied and C2 is released. To the right of the shift ratio line 91 is a preferred region of operation 95 for the second mode wherein C1 is released and C2 is applied. When used herein with respect to clutches C1 and C2, the term applied indicates substantial torque transfer capacity across the respective clutch while the term released indicates insubstantial torque transfer capacity across the respective clutch. Since it is generally preferred to cause shifts from one mode to the other to occur synchronously, torque transfers from one mode into the other mode are caused to occur through a two clutch application fixed ratio wherein, for a finite period prior to the release of the presently applied clutch, the presently released clutch is applied. And, the mode change is completed when fixed-ratio is exited by the continued application of the clutch associated with the mode being entered and the release of the clutch associated with the mode being exited. While region of operation 93 is generally preferred for the operation of the EVT in MODE 1, it is not meant to imply that MODE 2 operation of the EVT cannot or does not occur therein. Generally, however, it is preferred to operate in MODE 1 in region 93 because MODE 1 preferably employs gearsets and motor hardware particularly well suited in various aspects (e.g. mass, size, cost, inertial capabilities, etc.) to the high launch torques of region 93. Similarly, while region of operation 95 is generally preferred for the operation of the EVT in MODE 2, it is not meant to imply that MODE 1 operation of the EVT cannot or does not occur therein. Generally, however, it is preferred to operate in MODE 2 in region 95 because MODE 2 preferably employs gearsets and motor hardware particularly well suited in various aspects (e.g. mass, size, cost, inertial capabilities, etc.) to the high speeds of region 93. Region 93, wherein MODE 1 operation is generally preferred, may be considered a low speed region whereas region 95, wherein MODE 2 operation is generally preferred, may be considered a high speed region. A shift into MODE 1 is considered a downshift and is associated with a higher gear ratio in accordance with the relationship of Ni/No. Likewise, a shift into MODE 2 is considered an upshift and is associated with a lower gear ratio in accordance with the relationship of Ni/No.

The general objective of upshifts and downshifts performed in accordance with the present invention is to smoothly transition from one mode to another mode with minimal torque disturbances. With reference now to FIGS. 4A through 4D, an exemplary upshift is illustrated and hereafter described. It is understood, however, that downshifts are controlled in the same fashion and the description below is to be read with that understanding.

Operation within MODE 1 is initially presumed at time $t_0$. Within MODE 1, motor torque is controlled with the objective of establishing input member speed Ni to a desired input member speed $Ni_{13}$des. Direct coupling of the engine and the input member make the engine speed equivalent to the input member speed and Ni_des is equivalent to a desired engine speed. Desired engine speed is provided by the system controller, for example in accordance with a desired operating point of the engine to meet various efficiency and emission objectives. A preferred method of determining input speed is disclosed in commonly assigned and co-pending U.S. Ser. No. 10/686,508 filed Oct. 14, 2003 and U.S. Ser. No. 10/686,034 (now U.S. Pat. No. 6,957,137) filed Oct. 14, 2003 which are incorporated herein by reference. Control of the input member speed to a desired speed, Ni_des, may be performed in accordance with a preferred input speed controller described in commonly assigned and co-pending U.S. Ser. No. 10/686,511 filed Oct. 14, 2003 which is incorporated herein by reference.

Generally, the various motor torque controls in the present invention follows the general form matrix equation taught in co-pending U.S. Ser. No. 10/686,511 filed Oct. 14, 2003 and shown below as follows:

$$[Ta\ Tb]T = [B1] * [Ti\ To\ Ni\_dot\ No\_dot]T + [k1 k2]T * u$$

where
  Ta is externally applied motor A torque;
  Tb is externally applied motor B torque;
  Ti is externally applied input member torque;
  To is externally applied output member torque;
  Ni_dot is in put member acceleration;
  No_dot is output member acceleration;
  B1 is a matrix of parametric values determined by the hardware gear and shaft interconnections and estimated hardware inertias applicable to the current mode;
  k1 and k2 formulate a vector gain matrix for modifications of Ta and Tb; and,
  u is the desired closed loop control effort.

Other different independent member accelerations may be substituted for those shown above to arrive at similar matrix equations. Ni_dot and No_dot are selected as expedient since both input and output speed are quantities of general interest in other areas of the transmission and vehicle controls.

Within MODE 1, the general form matrix equation relies upon estimated substitutes for implementation. An estimated engine torque adjusted for losses, Ti_est, provides the quantity used for Ti in the motor torque equation. Desired output torque, To_des, is similarly substituted for To. And, a desired rate of change of transmission input speed, Ni_dot_des, is substituted for Ni_dot. No_dot, however, is provided by calculated output member acceleration No_dot_calc.

Within MODE 1, the objective of the control system is to maintain C1 engagement for lower range operation and to control input speed to optimize performance parameters of the system. As such, C1 is commanded to maximum pressure to maintain the clutch fully engaged. C2 on the other hand is commanded to minimum pressure to maintain the clutch fully disengaged. Clutch C1 and clutch C2 pressures are illustrated by the solid traces labeled 101 and 103, respectively, in the separate diagrams of FIG. 4D. Clutch C1 and clutch C2 commanded pressures are illustrated by the broken traces labeled 105 and 107, respectively, in the separate diagrams of FIG. 4D. The top diagram of FIG. 4D labeled "Off" corresponds to the offgoing clutch in the shift—in the case of an upshift from MODE 1 to MODE 2, clutch C1. The bottom diagram of FIG. 4D labeled "On" corresponds to the oncoming clutch in the shift—in the case of an upshift from MODE 1 to MODE 2, clutch C2. In intervals where only a solid line appears, the pressure is substantially equivalent to the commanded pressure. In intervals where both a solid and a broken line appear, the pressure is lagging the commanded pressure such as the case upon a commanded change in the clutch state.

It is a general objective of the present invention to effectuate shifts in a synchronous fashion, that is to say when the slip speed across both C1 and C2 is substantially zero. Slip across both C1 and C2 may be simultaneously zero when both clutches are applied and carrying torque such as is the case when the transmission operates in a fixed-ratio mode wherein the input and output are mechanically coupled through the transmission at a fixed ratio, GR. This fixed ratio, GR, is also the effective gear ratio at any time the slip speed across both clutches is zero, including such times when slip across one or more clutches is controlled to zero by motor torque control. The transmission is said to be synchronous when slip speed across both clutches is zero. The transmission is said to be operating in a fixed-ratio mode when operating synchronously with both clutches applied.

Figure 4A:
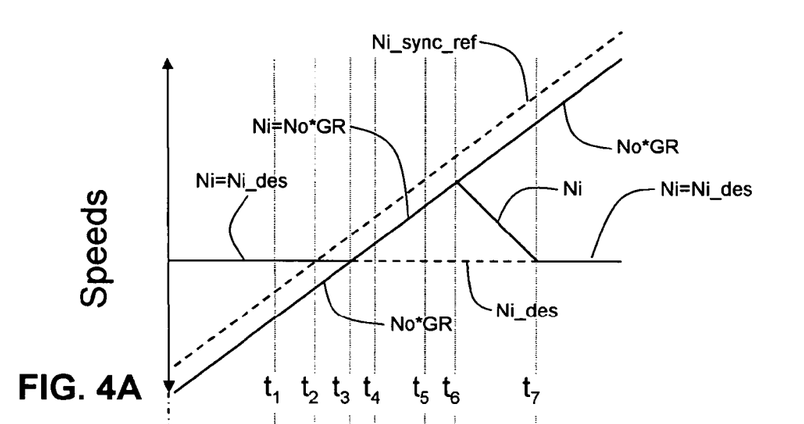
FIG. 4A illustrates various transmission speeds and control speeds.
Figure 4B:
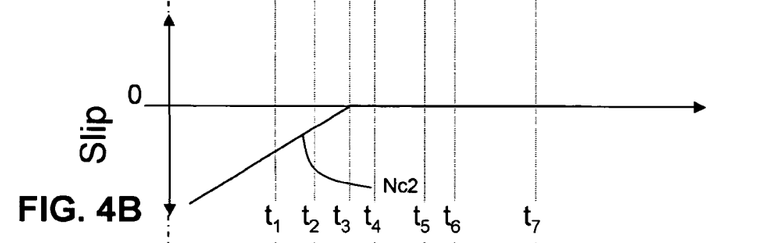
FIG. 4B illustrates the oncoming clutch slip.
Figure 4C:
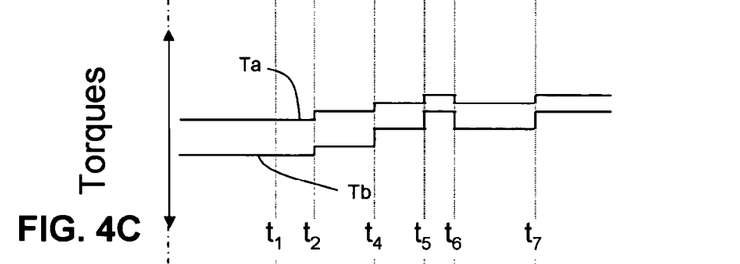
FIG. 4C illustrates motor torques.

As can be observed in FIG. 4B, slip across C2, Nc2, is seen converging toward zero. This condition is likely, for example, when the vehicle is accelerating. Clutch C1 is fully applied and as such slip thereacross is at zero. The transmission is therefore shown approaching synchronous operation. With clutch C1 fully applied and slip thereacross equal to zero, Clutch C2 slip, Nc2, may be determined in accordance with the following relationship:

$$Nc2 = Ni*K1 + No*K2$$

where

K1 and K2 are constants determined in accordance with the transmission gear and shaft interconnections.

This is further demonstrated in FIG. 4A wherein the output member speed, No, times the fixed ratio, GR, converges upon the input member speed, Ni, recalling that Ni/No equals GR at synchronous operation. During this MODE 1 operation, Ni is shown constant and equivalent to the desired input member speed, Ni_des, for simplicity of illustration; however, the motor torque control of MODE 1 may be converging Ni toward Ni_des in accordance with the input speed control of MODE 1.

At a time $t_1$ in FIGS. 4A-4D, an upshift is initiated. The timing of $t_1$ is critical in achieving smooth shifts. Preferably, time $t_1$ is a point whereat the slip speed trend is such that slip speed will attain zero within a period of time related to the application response time of the clutch C2. Such will allow for clutch application very close to the time when synchronous operation is likely to occur, thereby avoiding significant torque disturbances during clutch applications. In accordance with a preferred determination of time $t_1$, clutch C2 slip, Nc2, is periodically determined as previously described. With further reference to FIG. 5, from Nc2, clutch slip acceleration Nc2_dot is calculated by taking the derivative of Nc2, dNc2 with respect to time, dt, and then applying a conventional filter to eliminate large disturbances in a derivative calculation. In mathematical terms: Nc2_dot=Filter[d(Nc2)/dt]. Using Nc2 and Nc2_dot, a predictive estimation of the time to clutch synchronization (Nc2 reaching zero) can be calculated by the following relationship:

$$T\_est\_sync = -Nc2/Nc2\_dot.$$

Determination of clutch initiation is made by comparing T_est_sync to a clutch C2 fill time, T2_fill_time, in accordance with the following relationship when true:

$$T\_est\_sync < T2\_fill\_time \text{ for positive values of } T\_est\_sync.$$

When T_est_sync is positive clutch C2 slip speed is becoming smaller toward convergence toward zero and when T_est_sync is negative clutch C2 slip speed is becoming larger and is diverging away from synchronous clutch slip speed. Negative values for T_est_sync are therefore ignored since such represents operating conditions not expected to result in synchronous operation. Clutch C2 fill time, T2_fill_time, may be determined as a calibrated value, a table look-up dependent upon line pressure, or a combination thereof with or without adaptive adjustments.

Figure 4D:
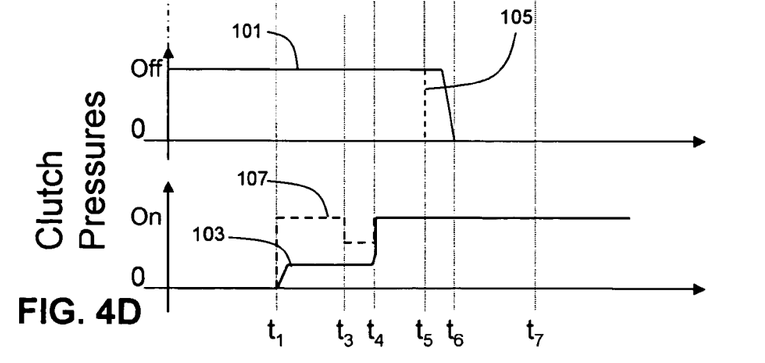
FIG. 4D illustrates oncoming and offgoing clutch pressures and commands.
Figure 5:
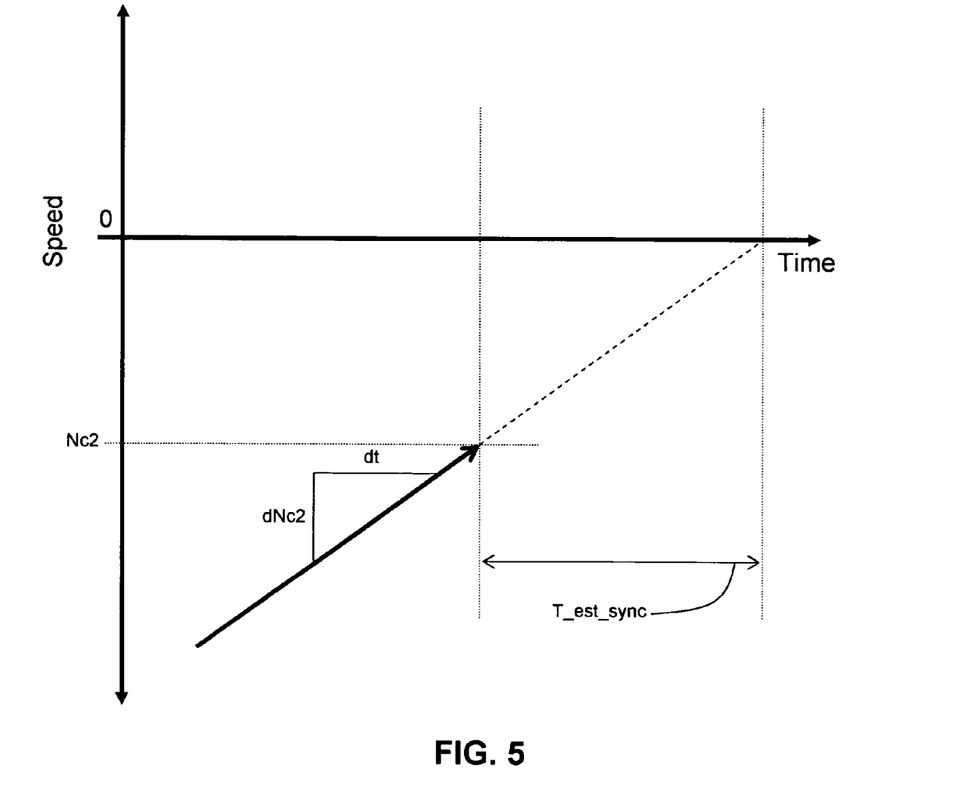
FIG. 5 is a graphic illustration of the determination of various quantities utilized in initiating a shift in accordance with the present invention.

At a time $t_1$ the oncoming clutch pressure for clutch C2 is commanded fully on as shown in trace 107 of FIG. 4D. Clutch pressure 103 initially rises and then levels off as the clutch chamber fills. All the while, clutch C1 remains commanded fully on. Clutch pressure for oncoming clutch C2 is initially commanded to maximum pressure to rapidly fill the clutch for a fixed length of time, Tmax. Preferably, Tmax is set to a value which is less than the smallest expected value for T_est_sync. Following the time Tmax, the clutch is commanded to a trim pressure for the duration of this clutch fill and synchronization. The trim pressure is desired to reduce the shock to transmission output torque that may occur due to any non-zero slip speed error at the time of full clutch application.

At time $t_2$ the motor torque control ceases to control input member speed, Ni, to a speed target, Ni_des. Instead, at time $t_2$ the motor torque control transitions to controlling the clutch C2 slip speed to zero. Given that clutch C1 slip is zero, then when clutch C2 slip Nc2 is zero it is known that Ni/No equals the fixed ratio, GR. In other words, Nc2 can be driven to zero slip, or synchronous speed, when Ni is driven to equal the ratioed output speed, No*GR. Motor torque control will drive clutch C2 slip, Nc2, to zero, and its acceleration, Nc2_dot to zero. Driving these two parameters simultaneously to zero is critical for the disturbanceless engagement of clutch C2. With these conditions, C2 can be engaged and disengaged without the engagement or disengagement causing any disturbance torque to the system. To accomplish zero slip speed control of clutch C2 with the general form of the motor torque matrix equation previously provided, certain references must be changed. As discussed, synchronous operation whereat clutch slips are equivalent to zero is characterized by the relationship wherein input speed is equivalent to ratioed output speed. By substitution of the ratioed output speed, No*GR, for input speed, Ni, into the calculations of affected terms of the motor torque control equation, the desired references are changed to effect the zero slip outcome. In other words, the Ni_dot_des term in the equation becomes No_dot_calc*GR and the equation for motor torque control to effect zero slip speed becomes as follows:

$$[Ta\ Tb]^T = [B1]*[Ti\_est\ To\_des\ No\_dot\_calc*GR\ No\_dot\_calc]^T + [k1k2]^T * u3$$

The closed loop effort u3 is determined in accordance with a Proportional-Integral (PI) controller to a calculated error in transmission input member speed, Ni_err, where Ni_sync_ref is the reference. A representation of such a PI controller is illustrated in FIG. 7. A description of the determination of Ni_sync_ref appears below in conjunction with FIG. 6.

Time $t_2$ is determined to be in advance of the transmission reaching synchronous operation. All speed control systems will inherently have a response lag in the resultant control. Therefore, an empirical estimate of the response lag within the system to an inflection point in the input speed control between following desired transmission input speed to following ratioed output speed is determined. Knowing and measuring the response characteristics of the ability of the motor control to follow inflection points in the reference used for input speed control allows for prediction of the response lag within the shift and thus determination of the empirical values for use in the control. Preferably, a lookup table is employed because the motor control response characteristics will typically vary with the inflection between the desired input speed control and ratioed output speed. Typically, a larger inflection will result in a larger response lag. When the empirical values within the table are matched to the input speed control system, the input speed will match the ratioed output speed (i.e. Ni=No*GR) and the input acceleration will match the ratioed output acceleration (Ni_dot=No_dot*GR).

Figure 6:
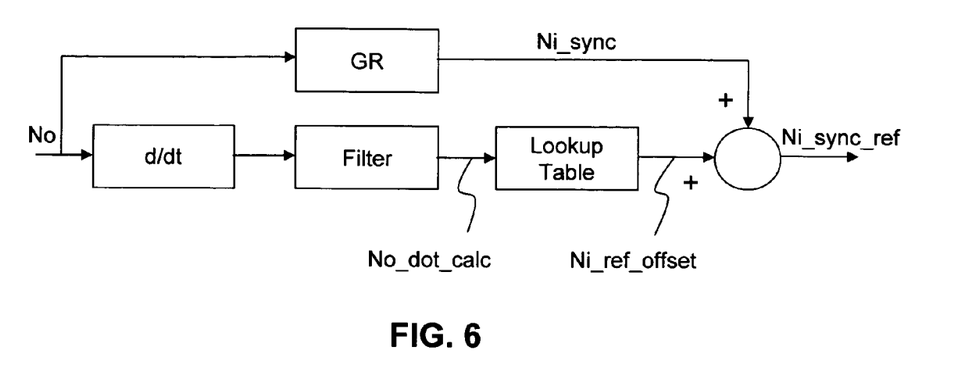
FIG. 6 is a block diagram of the determination of a reference signal utilized in motor torque control for clutch synchronizations in accordance with the present invention.
Figure 7:
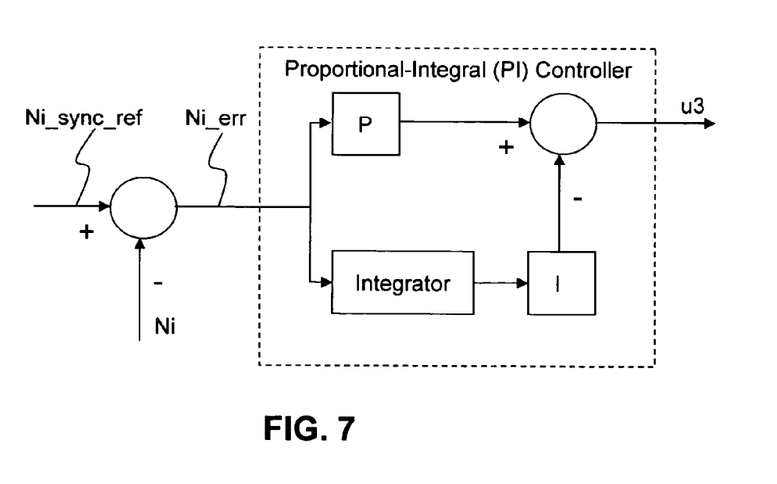
Figure 8A:
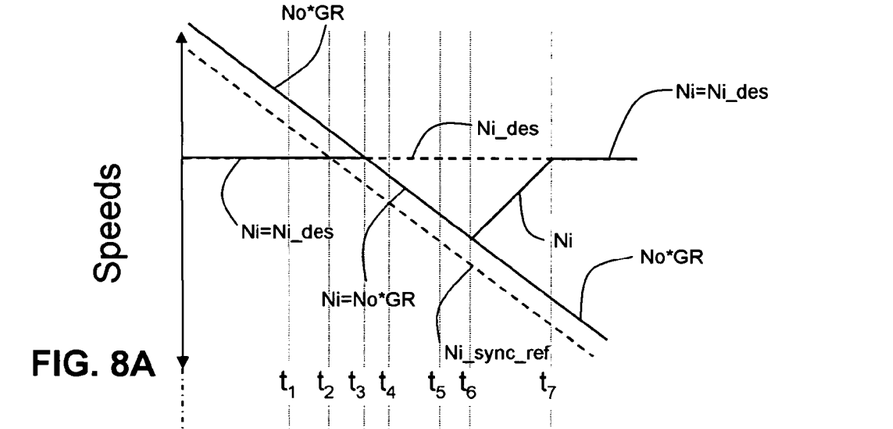
FIG. 8A illustrates various transmission speeds and control speeds.
Figure 8B:
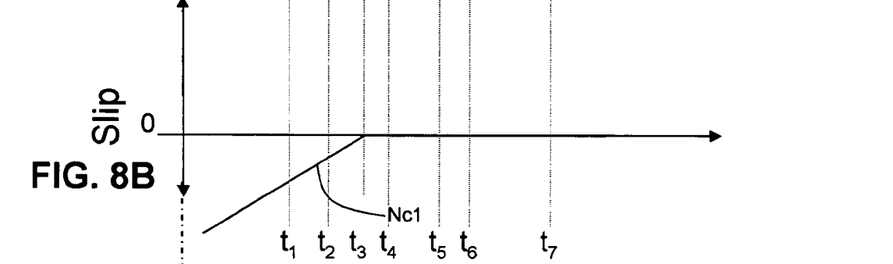
FIG. 8B illustrates the oncoming clutch slip.
Figure 8C:
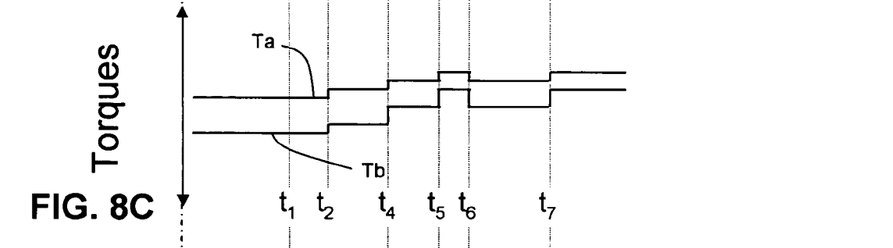
FIG. 8C illustrates motor torques.
Figure 8D:
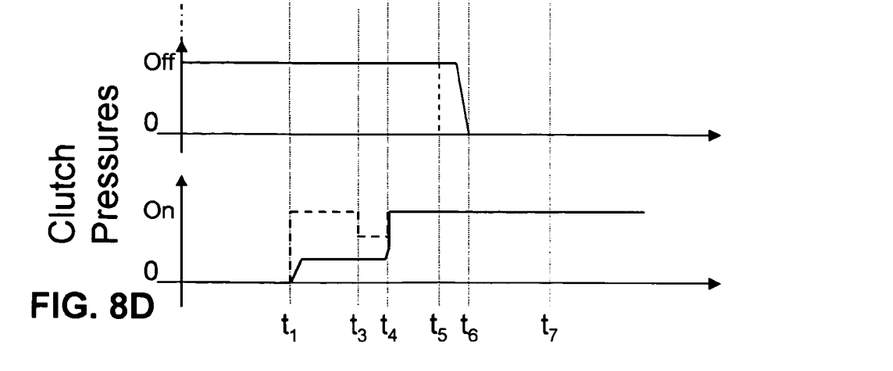
FIG. 8D illustrates oncoming and offgoing clutch pressures and commands.

As shown the block diagram of FIG. 6, a reference Ni_sync_ref is determined for use in comparison with Ni to determine the time $t_2$ whereat motor torque control transitions from input speed control to clutch slip control. Transmission output acceleration, No_dot_calc, is calculated by taking the derivative with respect to time of transmission output speed, No, and then passing this result through a filter, to eliminate large disturbances in the derivative calculation. This transmission output acceleration is then used as an input to an empirically determined lookup table to determine a reference input speed control offset value, Ni_ref_offset. This offset is then added to the synchronous input speed, Ni_sync, to obtain the reference input speed, Ni_sync_ref, for the closed loop control effort, u3, as described above. The synchronous input speed is the ratioed output speed, No*GR. When the transmission input speed, Ni, is determined to be below Ni_sync_ref, the motor torque control transition occurs. At this point, the transmission input speed control transitions from following the desired transmission input speed, Ni_des, to following Ni_sync_ref. This transition point and Ni_sync_ref are labeled $t_2$ and Ni_sync_ref, respectively, in FIG. 4A.

At time $t_3$ it can be observed that synchronous operation is achieved and that forward from that point the input speed is equivalent to the ratioed output speed in accordance with the motor torque control employed to control clutch C2 slip to zero. Clutch C2 pressure command is at a trim level less than maximum for torque shock reductions as previously described and actual clutch C2 pressure is still below that required for the clutch to carry significant torque.

At time $t_4$ clutch C2 fill is complete and pressure rises quickly. A pressure switch preferably will signal this pressure condition which indicates significant torque carrying capacity of clutch C2. In response, the pressure command is once again set to a maximum the actual pressure quickly rises to match the command. The clutch C2 at this point is generating a maximum torque capacity. It is at time $t_4$ when the clutch C2 has significant torque capacity that the motor torque control can transfer the torque being carried by the motors to maintain zero slip speed thereacross over to clutch C2.

When clutch C2 has torque capacity and is fully applied together with clutch C1, the transmission is operating at a fixed-ratio. Clutch slips are mechanically controlled to zero by the full application of the respective clutches and the input speed follows the ratioed output speed through the direct mechanical connection thereby established. Motor torque can no longer affect any speed control and rotate also in accordance with a set ratio relationship to the output speed. Torque contributions by the motors to the transmission during fixed-ratio operation can be used to effect various other system objectives at this time. Preferably, motor torques will be controlled in accordance with efficiency objectives. One exemplary control seeks to improve motor efficiencies by reducing currents through each motor. To attain improved efficiency in this manner, motor torques are calculated as if for operation in MODE 1 and are calculated as if for operation in MODE 2. An average of the MODE 1 and MODE 2 torques is taken to determine the motor torque command as follows:

$$Ta\_fixed\_ratio = (Ta\_MODE2 + Ta\_MODE1)/2$$

$$Tb\_fixed\_ratio = (Tb\_MODE2 + Tb\_MODE1)/2$$

where Ta_fixed_ratio and Tb_fixed_ratio are the resultant calculations used within fixed-ratio operation for motor A torque command and motor B torque command; Ta_MODE 2 and Tb_MODE 2 are the resultant calculations as would be used in MODE 2 operation; and Ta_MODE 1 and Tb_MODE 1 are the resultant calculations as would be used in MODE 1 operation. With this motor torque control, both motor A and motor B torques are generally reduced toward zero torque, thereby reducing the current which passes through each motor to thereby reduce motor losses and improve system efficiency.

To complete the upshift, the fixed-ratio operation must be exited and entry into the MODE 2 effected by the transfer of torque being carried by clutch C1 to the motors. Again, with the objective of producing minimal driveline torque disturbances during such transfer, control of the clutch C1 slip speed to zero is critical. At time t5 a decision is made to exit fixed-ratio operation and complete the upshift. This decision may primarily be based upon the general objective of preventing shift cycling conditions wherein exit from fixed-ratio operation is followed quickly by re-entry into fixed ratio operation. One manner of providing a decision of an appropriate exit from fixed-ratio operation is disclosed in commonly assigned and co-pending U.S. Ser. No. 10/686, 176 filed Oct. 14, 2003 which is incorporated herein by reference. In accordance with the teaching therein, exit is controlled based upon shift confidence factors determined in accordance with proportional and derivative input speed error quantities.

At time $t_6$, the offgoing clutch C1 is commanded to minimum pressure as illustrated by trace 105 in FIG. 4D. Actual clutch pressure lags the command and is completed at an advanced time $t_6$ whereat clutch torque capacity is substantially null. At time $t_5$, the motor torque control transitions to once again control a clutch slip speed to zero. This time, however, it is the offgoing clutch C1 that is controlled to zero slip speed thereacross. The motors take up the torque being carried by clutch C1 such that at the time of complete release at $t_6$ (or partial release prior thereto), the clutch slip speed is maintained at substantially zero and the transmission operates synchronously. Torque is thereby handed off from the offgoing clutch C1 to the motors. All the while, clutch C2 remains fully applied.

At time $t_6$ the motor torque control transitions to controlling the clutch C1 slip speed to zero. Given that clutch C2 slip is zero, then when clutch C1 slip Nc1 is zero it is known that Ni/No equals the fixed ratio, GR. In other words, Nc1 can be driven to zero slip, or synchronous speed, when Ni is driven to equal the ratioed output speed, No*GR. Motor torque control will drive clutch C1 slip, Nc1, to zero, and its acceleration, Nc1_dot to zero. Driving these two parameters simultaneously to zero is critical for the disturbanceless disengagement of clutch C1. With these conditions, C1 can be engaged and disengaged without the engagement or disengagement causing any disturbance torque to the system.

The motor torque control achieves the zero slip speed and torque transfer objective by controlling transmission input speed to match a reference input speed, Ni_ref, which is equivalent to the ratioed output speed. Prior to disengagement of the clutch C1, Ni is maintained identically equal to the ratioed output speed by the clutch engagement. Following clutch disengagement, Ni is maintained identically equal to the ratioed output speed by the motor torque control. This results in disturbanceless clutch disengagement.

At time $t_6$ the offgoing clutch C1 is without significant torque capacity and is considered full released. Detection of this transition occurs by a pressure switch measurement which measures when actual clutch pressure falls below a value, below which it can be assumed that the clutch is fully disengaged. A pressure switch preferably will signal this pressure condition though time or other basis may provide for the conclusion. In response, the motor torque control ceases controlling the clutch C1 slip speed to zero and transitions to control input member speed, Ni, to a speed target, Ni_des. Within MODE 2, motor torque is controlled with the objective of establishing input member speed Ni to a desired input member speed Ni_des. Direct coupling of the engine and the input member make the engine speed equivalent to the input member speed and Ni_des is equivalent to a desired engine speed. Desired engine speed is provided by the system controller, for example in accordance with a desired operating point of the engine to meet various efficiency and emission objectives, in the same manner as described previously for MODE 1 operation.

As previously mentioned, the above description is equally applicable to downshifts. Appropriate substitution of modes, clutches, gearset relationships, etc. will yield the same control results as will be understood by those skilled in the art. As such, FIGS. 8A-8D are provided to graphically illustrate a complementary downshift but are not separately described herein.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The invention claimed is:

1. A method for controlling a synchronous mode to mode shift in a multi-mode, electro-mechanical transmission including an input member and an output member, first and second torque transfer devices, at least one motor adapted for imparting torque to the transmission, first mode operation characterized by simultaneous first torque transfer device applied and second torque transfer device released states wherein the transmission input member is mechanically coupled to the transmission output member through a continuously variable ratio, second mode operation characterized by simultaneous first torque transfer device released and second torque transfer device applied states wherein the transmission input member is mechanically coupled to the transmission output member through a continuously variable ratio, and fixed-ratio operation characterized by simultaneous first and second torque transfer devices applied states wherein the transmission input member is mechanically coupled to the transmission output member through a fixed ratio, comprising:

applying the one of the first and second torque transfer devices which is initially in a released state while controlling slip speed thereacross to substantially zero by adjusting motor torque to establish synchronous operation wherein slip speed across the first and second torque transfer devices is substantially zero and thereafter releasing the other one of the first and second torque transfer devices which is initially in an applied state while controlling slip speed thereacross to substantially zero by adjusting motor torque.

2. The method for controlling a synchronous mode to mode shift as claimed in claim 1 wherein controlling slip speed across the one of the first and second torque transfer devices which is initially in a released state to substantially zero by adjusting motor torque terminates when the one of the first and second torque transfer devices which is initially in a released state is fully applied.

3. The method for controlling a synchronous mode to mode shift as claimed in claim 1 wherein controlling slip speed across the one of the first and second torque transfer devices which is initially in an applied state to substantially zero by adjusting motor torque terminates when the one of the first and second torque transfer devices which is initially in an applied state is fully released.

4. The method for controlling a synchronous mode to mode shift as claimed in claim 1 wherein controlling slip speed across torque transfer devices to substantially zero comprises controlling input member speed to a speed whereat the ratio of input member speed to output member speed is substantially said fixed ratio.

5. The method for controlling a synchronous mode to mode shift as claimed in claim 1, wherein the at least one motor comprises two electrical motors.

6. A method for controlling a shift from a first mode to a second mode in a multi-mode, electro-mechanical transmission including an input member and an output member, first and second torque transfer devices, at least one motor, first mode operation characterized by simultaneous first torque transfer device applied and second torque transfer device released, second mode operation characterized by simultaneous first torque transfer device released and second torque transfer device applied, and fixed-ratio operation characterized by simultaneous first and second torque transfer devices applied wherein the transmission input member is mechanically coupled to the transmission output member through a fixed ratio, comprising:

applying an oncoming torque transfer device while controlling slip speed across the oncoming torque transfer device to substantially zero by adjusting motor torque and thereafter releasing an offgoing torque transfer device while controlling slip speed across the offgoing torque transfer device to substantially zero by adjusting motor torque, wherein applying the oncoming torque transfer device is initiated when a predicted period needed for full torque transfer device engagement is substantially equivalent to a predicted period for oncoming torque transfer device slip speed to reach zero.

7. The method for controlling a shift as claimed in claim 6 wherein controlling slip speed across the oncoming torque transfer device to substantially zero by adjusting motor torque is initiated subsequent to initiation of applying the oncoming torque transfer device.

8. The method for controlling a shift as claimed in claim 7 wherein controlling slip speed across the oncoming torque transfer device to substantially zero by adjusting motor torque is initiated a predetermined time prior to slip speed across the oncoming torque transfer device reaching zero.

9. The method for controlling a shift as claimed in claim 8 wherein said predetermined time is a function of output member acceleration.

10. The method for controlling a shift as claimed in claim 6 wherein said predicted period needed for full torque transfer device engagement is adaptively learned.

11. The method for controlling a shift as claimed in claim 6 wherein said predicted period for oncoming torque transfer device slip speed to reach zero is determined from a trend in transmission speeds during said first mode operation.

12. The method for controlling a shift as claimed in claim 6 wherein said first mode of operation is preferred for low speed operation, said second mode of operation is preferred for high speed operation, and said shift is an upshift.

13. The method for controlling a shift as claimed in claim 6 wherein said first mode of operation is preferred for high speed operation, said second mode of operation is preferred for low speed operation, and said shift is a downshift.

14. A mode to mode shift control for a multi-mode, electro-mechanical transmission including an input member and an output member, first and second torque transfer devices, at least one motor, first mode operation characterized by simultaneous first torque transfer device applied and second torque transfer device released states wherein the transmission input member is mechanically coupled to the transmission output member through a continuously variable ratio, second mode operation characterized by simultaneous first torque transfer device released and second torque transfer device applied states wherein the transmission input member is mechanically coupled to the transmission output member through a continuously variable ratio, and fixed-ratio operation characterized by simultaneous first and second torque transfer devices applied states wherein the transmission input member is mechanically coupled to the transmission output member through a fixed ratio, comprising:

a computer based controller for establishing motor torque in accordance with a control sequence including;
a mode motor control during which said transmission is operating in one of said first and second modes and motor torque is used to control transmission input member speed to a target determined independent of speed across the torque transfer devices,
a shift initiation motor control during which motor torque is used to control speed across the one of the first and second torque transfer devices which is initially in a released state to substantially zero, and
a shift completion motor control during which motor torque is used to control speed across the other one of the first and second torque transfer devices which is initially in an applied state to substantially zero.

15. The mode to mode shift control as claimed in claim 14 wherein said control sequence further comprises a fixed-ratio motor control intermediate said shift initiation motor control and said shift completion motor control during which motor torque is not used in controlling transmission speeds.

16. The mode to mode shift control as claimed in claim 14 wherein said shift initiation motor control is terminated when the one of the first and second torque transfer devices which is initially in a released state is fully applied.

17. The mode to mode shift control as claimed in claim 14 wherein said shift completion motor control is terminated when the other one of the first and second torque transfer devices which is initially in an applied state is fully released.

18. The mode to mode shift control as claimed in claim 14 wherein said shift initiation motor control and shift completion motor control comprise controlling input member speed to a speed whereat the ratio of input member speed to output member speed is substantially said fixed ratio.

19. A method for controlling a mode to mode shift in a multi-mode, electro-mechanical transmission including an input member and an output member, first and second torque transfer devices, at least one motor, first mode operation characterized by simultaneous first torque transfer device applied and second torque transfer device released states wherein the transmission input member is mechanically coupled to the transmission output member through a continuously variable ratio, second mode operation characterized by simultaneous first torque transfer device released and second torque transfer device applied states wherein the transmission input member is mechanically coupled to the transmission output member through a continuously variable ratio, and fixed-ratio operation characterized by simultaneous first and second torque transfer devices applied states wherein the transmission input member is mechanically coupled to the transmission output member through a fixed ratio, comprising, in sequence:

establishing synchronous operation of the transmission by using motor torque to control slip across the one of the first and second torque transfer devices which is initially in a released state to substantially zero;
establishing fixed-ratio operation of the transmission by transferring torque being carried by said at least one motor during synchronous operation of the transmission to said one of the first and second torque transfer devices which is initially in a released state when said one of the first and second torque transfer devices which is initially in a released state has established sufficient capacity to accept said transfer of torque without slipping; and,
establishing synchronous operation of the transmission by transferring torque being carried by the other one of the first and second torque transfer devices which is initially in an applied state to said at least one motor.

20. A method for controlling a mode to mode shift as claimed in claim 19 wherein prior to establishing synchronous operation of the transmission, using motor torque to control transmission input speed to a predetermined input speed target.

21. A method for controlling a mode to mode shift as claimed in claim 20 wherein subsequent to transferring torque being carried by the other one of the first and second torque transfer devices which is initially in an applied state to said at least one motor, using motor torque to control transmission input speed to a predetermined input speed target.

22. A method for controlling a mode to mode shift in a multi-mode, electro-mechanical transmission including an input member and an output member, first and second torque transfer devices, at least one motor, first mode operation characterized by simultaneous first torque transfer device applied and second torque transfer device released states wherein the transmission input member is mechanically coupled to the transmission output member through a continuously variable ratio, second mode operation characterized by simultaneous first torque transfer device released and second torque transfer device applied states wherein the transmission input member is mechanically coupled to the transmission output member through a continuously variable ratio, and fixed-ratio operation characterized by simultaneous first and second torque transfer devices applied states wherein the transmission input member is mechanically coupled to the transmission output member through a fixed ratio, comprising:

applying the one of the first and second torque transfer devices which is initially in a released state while controlling slip speed thereacross to substantially zero by adjusting motor torque and thereafter releasing the other one of the first and second torque transfer devices which is initially in an applied state while controlling slip speed thereacross to substantially zero by adjusting motor torque wherein applying the one of the first and second torque transfer devices which is initially in a released state is initiated when a predicted period needed for full torque transfer engagement thereof is substantially equivalent to a predicted period for slip speed thereacross to reach zero.

23. The method for controlling a mode to mode shift as claimed in claim 22 wherein controlling slip speed across the one of the first and second torque transfer devices which is initially in a released state to substantially zero by adjusting motor torque is initiated subsequent to initiation of application thereof.

24. The method for controlling a mode to mode shift as claimed in claim 23 wherein controlling slip speed across the one of the first and second torque transfer devices which is initially in a released state to substantially zero by adjusting motor torque is initiated a predetermined time prior to slip speed thereacross reaching zero.

25. The method for controlling a mode to mode shift as claimed in claim 24 wherein said predetermined time is a function of output member acceleration.

26. The method for controlling a mode to mode shift as claimed in claim 22 wherein said predicted period needed for full torque transfer engagement is adaptively learned.

27. The method for controlling a mode to mode shift as claimed in claim 22 wherein said period for slip speed to reach zero is determined from a trend in transmission speeds during mode operation.

* * * * *